(12) United States Patent
Knebel (10) Patent No.: US 6,831,780 B2
(45) Date of Patent: Dec. 14, 2004

(54) MICROSCOPE ASSEMBLAGE (75) Inventor: Werner Knebel, Kronau (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 0 days.

(21) Appl. No.: 09/759,509

(22) Filed: Jan. 12, 2001

(65) Prior Publication Data

US 2001/0012151 A1 Aug. 9, 2001

(30) Foreign Application Priority Data

Jan. 27, 2000 (DE) .......................... 100 03 570

(51) Int. Cl.⁷ .......................... G02B 21/06; H01J 3/14
(52) U.S. Cl. .......................... 359/385; 359/368; 250/234
(58) Field of Search .......................... 359/368–390; 280/458.1, 459.1, 461.1, 461.2, 201.1–201.4, 234

(56) References Cited

U.S. PATENT DOCUMENTS

| 3,421,806 | A | * | 1/1969 | Weber | .......................... 356/432 |
|---|---|---|---|---|---|
| 4,893,008 | A | * | 1/1990 | Horikawa | .......................... 250/234 |
| 5,260,569 | A | * | 11/1993 | Kimura | .......................... 250/234 |
| 5,535,052 | A | * | 7/1996 | Jorgen | .......................... 359/388 |
| 5,796,112 | A | * | 8/1998 | Ichie | .......................... 250/458.1 |
| 5,874,726 | A | * | 2/1999 | Haydon | .......................... 250/201.1 |

FOREIGN PATENT DOCUMENTS

| DE | 37 42 806 | * | 7/1989 | .................. 359/385 |
|---|---|---|---|---|
| DE | 199 02 625 A1 | | 9/1999 | |

* cited by examiner

Primary Examiner—Thong Q Nguyen
(74) Attorney, Agent, or Firm—Simpson & Simpson, PLLC (57) ABSTRACT A microscope assemblage, in particular for confocal scanning microscopy, having a light source (1) for illuminating a specimen (6) to be examined and at least one fluorescent-light detector (11, 14) for the detection of fluorescent light (10, 13) generated in the specimen (6) and at least one transmitted-light detector (16) for the detection of transmitted light (15) passing through the specimen (6), is configured and developed, with a view toward reliable performing a wide variety of experiments with a high level of detection in each case, such that the fluorescent-light and transmitted-light detectors (11, 14; 16) are arranged in such a way as to make possible simultaneous detection of fluorescent and transmitting light (10, 13; 15).

14 Claims, 6 Drawing Sheets

MICROSCOPE ASSEMBLAGE

CROSS REFERENCE TO RELATED APPLICATIONS

This invention claims priority of a German patent application DE 100 03 570.1 which is incorporated by reference herein.

FIELD OF THE INVENTION

The invention concerns a microscope assemblage, in particular for confocal scanning microscopy, having a light source for illuminating a specimen to be examined and at least one fluorescent-light detector for the detection of fluorescent light generated in the specimen and at least one transmitted-light detector for the detection of transmitted light passing through the specimen.

BACKGROUND OF THE INVENTION

Microscope assemblages of the kind cited above are known from practical use and exist in a wide variety of embodiments. One example of such a microscope assemblage is constituted by a confocal scanning microscope in which a specimen to be examined is scanned with a light beam. The microscope generally comprises a light source and a focusing optical system with which the light of the source is focused onto an aperture stop. A beam splitter, a scanning device for beam control, a microscope optical system, a detection stop, and detectors for the detection of detected or fluorescent light are provided.

The illuminating light is usually coupled in via the beam splitter. The focus of the light beam is moved with the scanning device in one specimen plane. This is usually done with two mirrors which are tilted, the deflection axes usually being located perpendicular to one another, so that one mirror deflects in the X direction and the other in the Y direction. Tilting of the mirrors is brought about, for example, with the aid of galvanometer positioning elements. In this "descan" arrangement that is usual, the fluorescent or reflected light coming from the specimen arrives via the same scanning mirror back at the beam splitter and passes through it, then being focused onto the detection stop behind which the detectors are located. Detected light that does not derive directly from the focus region takes a different light path and does not pass through the detection stop, so that a point datum is obtained and yields, by scanning of the specimen, a three-dimensional image. Illumination and detection occur here on the objective side, i.e. by way of the microscope optical system.

In a transmitted-light arrangement it is also possible, for example, to detect the fluorescent light or the transmitted light (the transmitted exciting light) on the condenser side, i.e. on the side of a condenser arranged after the specimen. The detected light beam then does not pass via the scanning mirror to the detector. An arrangement of this kind is called a "non-descan" arrangement.

In the transmitted-light arrangement, a condenser-side detection stop would be necessary for detection of the fluorescent light in order, as in the case of the descan arrangement described, to achieve three-dimensional resolution. In the case of two-photon excitation, however, a condenser-side detection stop can be dispensed with, since the excitation probability depends on the square of the photon density or intensity, which of course is much greater at the focus than in the adjacent regions. A very large proportion of the fluorescent light to be detected therefore derives, with high probability, from the focus region, rendering superfluous any further differentiation, using a stop arrangement, between fluorescent photons from the focus region and fluorescent photons from the adjacent regions.

Especially given that the yield of fluorescent photons with two-photon excitation is in any case low, a non-descan arrangement, in which less light is generally lost along the detected light path, is of interest But even when fluorescent light is observed in this manner, cell outlines, for example, cannot be detected sufficiently well because they are not labeled in living preparations, so that it would be desirable simultaneously to be able to observe the transmitted light, which would allow definite conclusions to be drawn.

Microscope assemblages do exist in which objective-side fluorescence detection on the one hand, and condenser-side transmission detection on the other hand, are possible. In this context, however, changing from objective-side fluorescence detection to condenser-side transmission detection and vice versa requires a mechanical switching operation in which mirrors and filters must be mechanically displaced. This can cause shocks to the specimen which destroy it. Experiments with micropipette arrangements, in particular, are thus almost ruled out.

SUMMARY OF THE INVENTION

The present invention is therefore based on the object of describing a microscope assemblage of the kind cited initially in which a very wide variety of experiments, in particular experiments with micropipette arrangements, can reliably be made with a high level of detection in each case.

The aforesaid object is achieved by a microscope assemblage which comprises: a light source for illuminating a specimen, at least one fluorescent-light detector for the detection of fluorescent light generated in the specimen and at least one transmitted-light detector for the detection of transmitted light passing through the specimen, wherein the fluorescent-light and transmitted-light detectors are arranged to enable simultaneous detection of fluorescent and transmitted light.

The object is achieved as well by a microscope assemblage which comprises: a light source for illuminating a specimen, at least one fluorescent-light detector for the detection of fluorescent light generated in the specimen; at least one transmitted-light detector for the detection of transmitted light passing through the specimen, wherein the fluorescent-light and transmitted-light detectors are arranged to enable simultaneous detection of fluorescent and transmitted light and a first polarization device is provided between the light source and the specimen, a second polarization device in provided after the specimen.

Furthermore, the object is achieved by an other embodiment of the microscope assemblage, which comprises: a light source for illuminating a specimen, at least one fluorescent-light detector for the detection of fluorescent light generated in the specimen, wherein the specimen defines a top side facing the light source and a bottom side facing away from the light source, at least one transmitted-light detector for the detection of transmitted light passing through the specimen, and an additional light source being arranged on the side of the specimen facing away from the light source.

What has been recognized according to the present invention is that by skillful arrangement of the fluorescent-light and transmitted-light detectors, the aforesaid object is achieved in surprisingly simple fashion. For this purpose, the fluorescent-light and transmitted-light detectors are arranged in such a way that simultaneous detection of fluorescent light and transmitted light is made possible. Switching over between transmitted-light and fluorescent-light detection is no longer necessary, so that mechanical shocks to the sample or specimen are prevented. A high level of detection is thus achieved in terms of both the detection of transmitted light and the detection of fluorescent light, even with sensitive specimens.

The microscope assemblage according to the present invention consequently provides a microscope assemblage with which a very wide variety of experiments, in particular experiments with micropipette arrangements, can reliably be made with a high level of detection in each case.

BRIEF DESCRIPTION OF THE DRAWINGS

In conjunction with the explanation of the preferred exemplary embodiments of the invention with reference to the drawings, a general explanation is also given of preferred embodiments and developments of the teaching. In the drawings.

DETAILED DESCRIPTION OF THE INVENTION

In a concrete embodiment, at least one fluorescent-light detector could be arranged on the side of the specimen facing away from the light source. Alternatively or in addition thereto, at least one transmitted-light detector could be arranged on the side of the specimen facing away from the light source. This makes possible, for example, simultaneous detection of fluorescent light and transmitted light by way of detectors that are each arranged on the side of the specimen facing away from the light source. This has the advantage of a well-organized arrangement of the detectors in one specific region of the microscope assemblage.

In addition, a condenser for the transmitted light and the fluorescent light could be arranged on the side of the specimen facing away from the light source. In the interest of particularly effective light collection, the aperture of the condenser could be larger than the aperture of an objective arranged between the light source and the specimen. When a condenser of this kind is present, and with a corresponding arrangement of the detectors, it is possible to speak of "condenser-side" detection of fluorescent light and transmitted light.

For separate detection of transmitted light and fluorescent light, the transmitted light and the fluorescent light could be divisible on the side of the specimen facing away from the light source, preferably after passing through the condenser. This would result in a physical separation of the fluorescent light from the transmitted light This makes possible separate measurement of the corresponding light outputs in different detectors.

Concretely, at least one color beam splitter could be used for division. In this context, multiple color beam splitters could be arranged one behind another in order to allow the separation of different wavelengths or wavelength regions.

As an alternative to this, at least one semitransparent mirror could be used for division. That mirror or mirrors could have a bandpass filter or blocking filter placed after them. Even when mirrors are used as the division component, several such mirrors could be arranged one behind another, optionally with a bandpass filter or blocking filter placed after them. This, too, makes it possible to divide the fluorescent light into several spectral regions.

As an alternative to the use of color beam splitters or mirrors, a multiband detector that is described, for example, in DE 199 02 625 A1 could be used for division. A multiband detector of this kind also makes it possible to divide the fluorescent light into several spectral regions.

In a particularly compact embodiment of the microscope, the fluorescent light and transmitted light could be detectable in the same detector. In the interest of the clearest possible differentiation, however, the fluorescent light and transmitted light could be detectable in different detectors.

The microscope assemblage according to the present invention can be used in particular for interference contrast microscopy. For this purpose, a first polarization device could be arranged between the light source and the specimen, preferably before the objective, and a second polarization device after the specimen, preferably after the condenser. The polarization devices could be constituted, in particularly simple fashion, by prisms. Wollaston prisms are particularly suitable in this context.

In order to determine whether any rotation of the linear polarization plane has occurred, a polarization filter could be arranged before the transmitted-light detector. The polarization filter must be oriented in such a way that it would block an illuminating light beam without the influence of a polarization device.

The microscope assemblage according to the present invention could also be used in transmitted-light contrast microscopy. For that purpose, a sector optical system, sector polarization optical system, sector stop, sector phase stop, or sector phase filter could be arranged in the beam path. The sector optical system, sector polarization optical system, sector stop, sector phase stop, or sector phase filter could be arranged in a Fourier plane of the beam path. For that purpose, the sector optical system, sector polarization optical system, sector stop, sector phase stop, or sector phase filter could be arranged in the Fourier plane immediately before the transmitted-light detector. This would make it possible to implement, for example, the Dodt method or Hoffman method. The fluorescent light could also be simultaneously observed in this context, although this cannot be done confocally with one-photon excitation.

With regard to a further particular embodiment of the microscope assemblage, an additional light source could be arranged on the side of the specimen facing away from the light source (on the condenser side, if a condenser is present). As a result, the specimen could optionally be illuminated on the condenser side, and detection could then take place on the side of the specimen facing toward the light source (the objective side). The additional light source could, in simple fashion, be a white light source.

For phase contrast, a sector optical system, sector polarization optical system, sector stop, sector phase stop, or sector phase filter could be associated with the additional light source. In particularly favorable fashion, the sector optical system, sector polarization optical system, sector stop, sector phase stop, or sector phase filter could be arranged in the Fourier plane before the additional light source.

A scanning device could be arranged on the side of the specimen facing toward the light source. The light generated by the additional light source could also be deflected by the scanning device before it strikes a transmitted-light detector or scanner detector. For this purpose, at least one transmitted-light detector could be arranged on the side of the specimen facing toward the light source, preferably on the side of the scanning device facing away from the specimen.

In particularly advantageous fashion, a laser could be used as the light source. The use of other suitable light sources is also conceivable, however.

The microscope assemblage according to the present invention is suitable in particular for the simultaneous detection of one or more wavelength regions of the fluorescent light generated by multiple-photon excitation and/or of the fluorescent light generated by one-photon excitation or second harmonic generation (SHG), and of transmitted light.

In a specific application, the microscope assemblage according to the present invention could also be used to detect fluorescent light of different wavelength regions and transmitted light sequentially and not simultaneously, with no need for mechanical switchover operations (e.g. the displacement or replacement of beam splitters or filters) which inevitably cause shocks to the specimen. The microscope assemblage is therefore also particularly suitable for sequential detection of different fluorescent spectral regions and/or of transmitted light in applications with specimens that are externally influenced, for example by micromanipulators, micropipettes, or the like.

Figure 1:
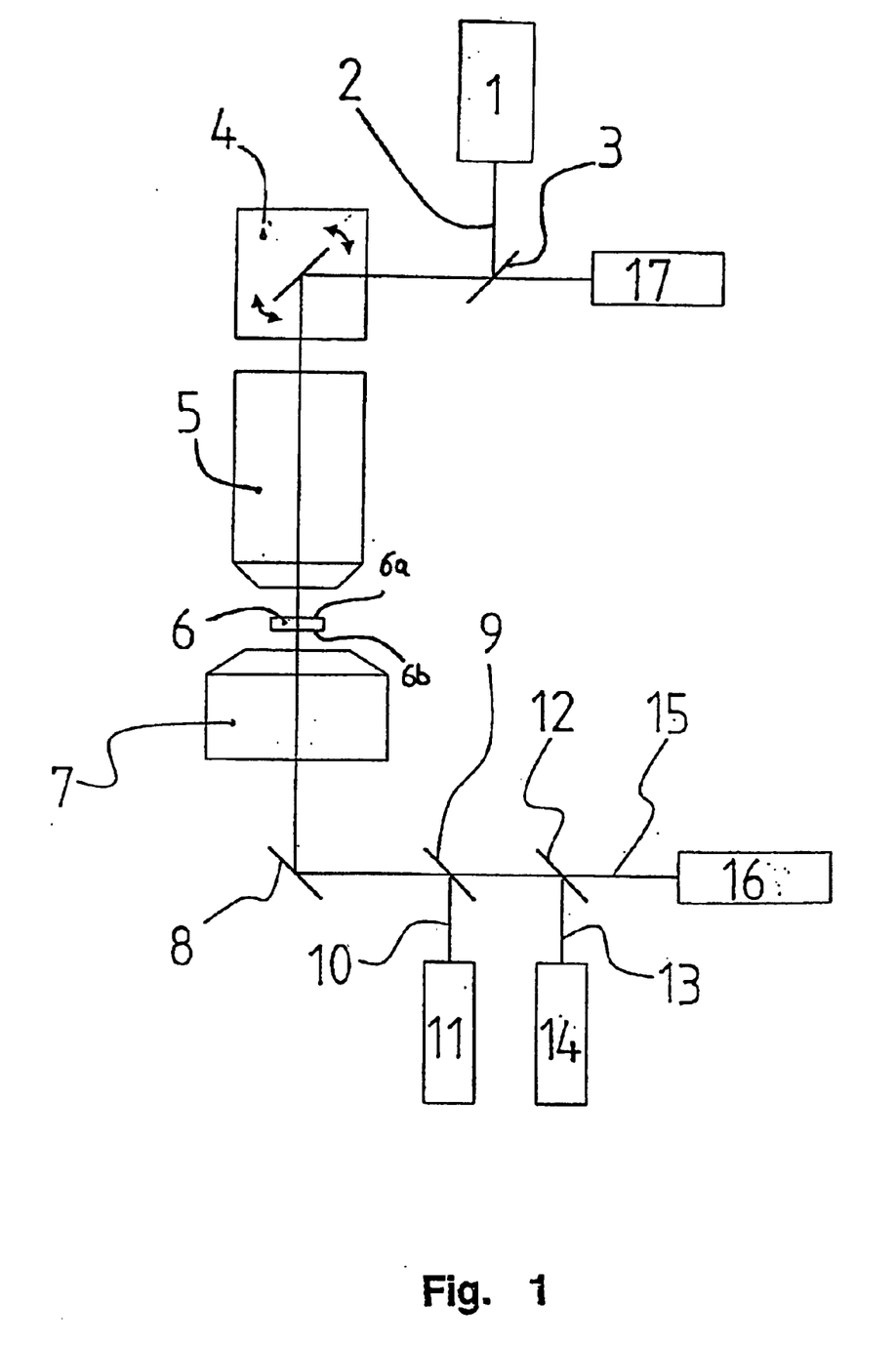
FIG. 1 shows, in a schematic depiction, a first exemplary embodiment of a microscope assemblage according to the present invention.

FIG. 1 shows, in a schematic depiction, a first exemplary embodiment of a microscope assemblage according to the present invention. The microscope assemblage is a confocal laser scanning microscope. The microscope has a light source 1 configured as a laser. Light source 1 emits an illuminating light beam 2 that is reflected via a main beam splitter 3 to a scanning device 4. Scanning device 4 guides illuminating light beam 2 by way of a microscope optical system or objective 5 through a specimen 6. Both the transmitted light passing through specimen 6 and the fluorescent light generated in specimen 6 pass via a condenser 7 and a deflection mirror 8 to a first color beam splitter 9 which splits off the spectrally lower-wavelength region 10 of the fluorescent light and reflects it to a fluorescent-light detector 11. The spectrally higher-wavelength region 13 of the fluorescent light is reflected via a color beam splitter 12 to a further fluorescent-light detector 14. Transmitted light 15 arrives at a transmitted-light detector 16 arranged in the straight-ahead direction.

The microscope assemblage consequently has a light source 1 for illuminating a specimen 6 being examined, two fluorescent-light detectors 11 and 14 for detecting fluorescent light 10 and 13 generated in specimen 6, and a transmitted-light detector 16 for detecting transmitted light 15 passing through specimen 6. The fluorescent-light and transmitted-light detectors 11, 14, and 16 are arranged in such a way as to make possible simultaneous detection of fluorescent and transmitted light 10, 13, and 15. The specimen 6 defines a top side 6a facing the light source 1 and a bottom side 6b facing away from the light source 1.

The microscope assemblage shown in FIG. 1 furthermore has a detector 17 that is arranged on the objective side. The detector 17 in this embodiment ist used for the detection of fluorescent light from the specimen 6.

Both fluorescent-light detectors 11 and 14 are arranged on the side of specimen 6 facing away from light source 1. Transmitted-light detector 16 is also arranged on the side of specimen 6 facing away from light source 1.

Figure 2:
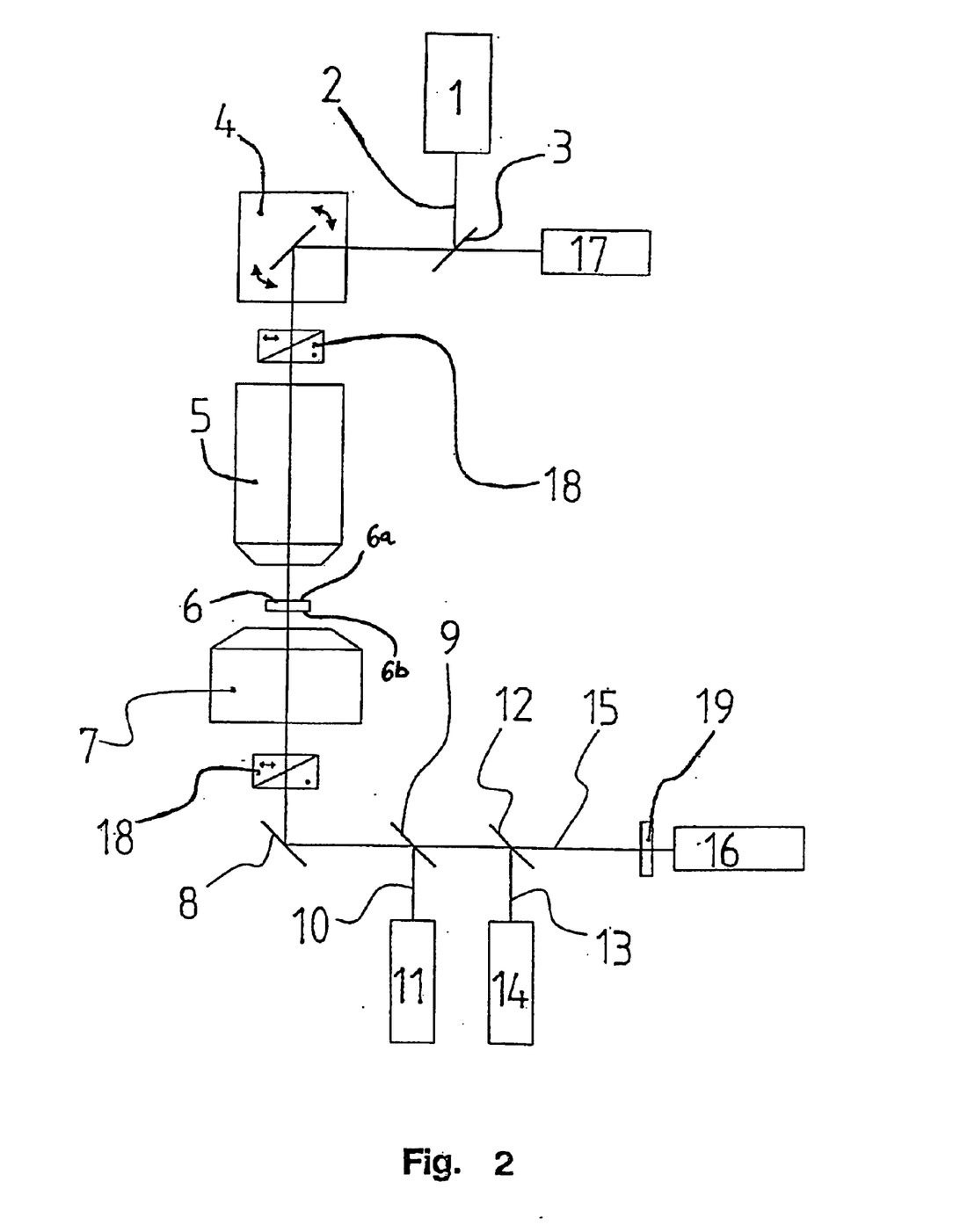
FIG. 2 shows, in a schematic depiction, a second exemplary embodiment of a microscope assemblage according to the present invention having two polarization prisms.

FIG. 2 shows, in a schematic depiction, a second exemplary embodiment of a microscope assemblage according to the present invention. The microscope assemblage shown in FIG. 2 corresponds substantially to the microscope assemblage of FIG. 1, components that correspond to components already described in FIG. 1 being labeled with the same reference characters.

The microscope assemblage shown in FIG. 2 is suitable in particular for differential interference contrast (DIC) microscopy with simultaneous fluorescence detection. For that purpose, the microscope assemblage has two polarization devices configured as polarization prisms 18. Polarization prisms 18 are constituted by so-called Wollaston prisms. The one polarization prism is arranged between light source 1 and specimen 6, more precisely before objective 5. The second polarization prism 18 is arranged after specimen 6, more precisely after condenser 7.

Differential interference contrast makes it possible to observe phase objects with simultaneous fluorescence detection. The linearly polarized exciting light of light source 1 (configured as a laser) is split into two partial beams, before objective 5, with the aid of the first polarization prism 18. The two partial beams then pass through specimen 6 along slightly different paths, and are recombined after condenser 7 with the aid of the second polarization prism 18. If the two partial beams have traveled along optical paths of different lengths, this is expressed, after the beams are combined, in a rotation of the linear polarization plane which is analyzed by way of a polarization filter 19 before transmitted-light detector 16. Polarization filter 19 must be oriented in such a way that it would block an illuminating beam passing directly through without polarization prisms 18.

Figure 3:
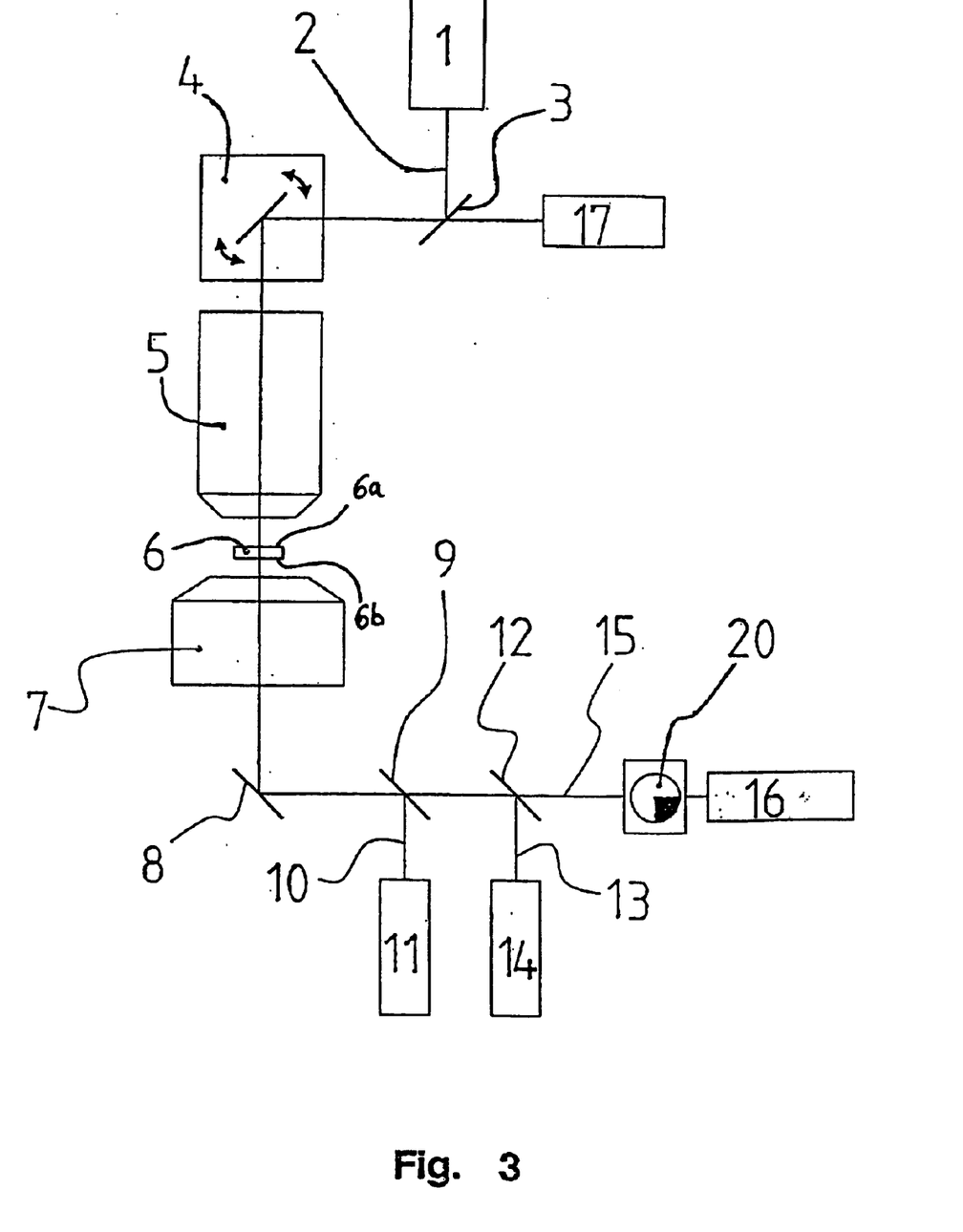
FIG. 3 shows, in a schematic depiction, a third exemplary embodiment of a microscope assemblage according to the present invention having a sector stop.

FIG. 3 shows, in a schematic depiction, a third exemplary embodiment of a microscope assemblage according to the present invention. The microscope assemblage shown here corresponds substantially to the microscope assemblage shown in FIG. 1, components that correspond to components already described in FIG. 1 being labeled with the same reference characters.

The microscope assemblage shown in FIG. 3 can be used in particular for phase contrast microscopy. For that purpose, the microscope assemblage has a sector stop 20 arranged in the Fourier plane before transmitted-light detector 16. Fluorescent light 10 and 13 is simultaneously observable.

The Dodt method can be performed with sector stop 20. Also usable, as an alternative to a sector stop 20, is a sector polarization optical system with which, for example, the Hoffman method can be used, fluorescent light 10 and 13 being simultaneously observable. With one-photon excitation, however, fluorescent light 10 and 13 cannot be observed confocally.

Figure 4:
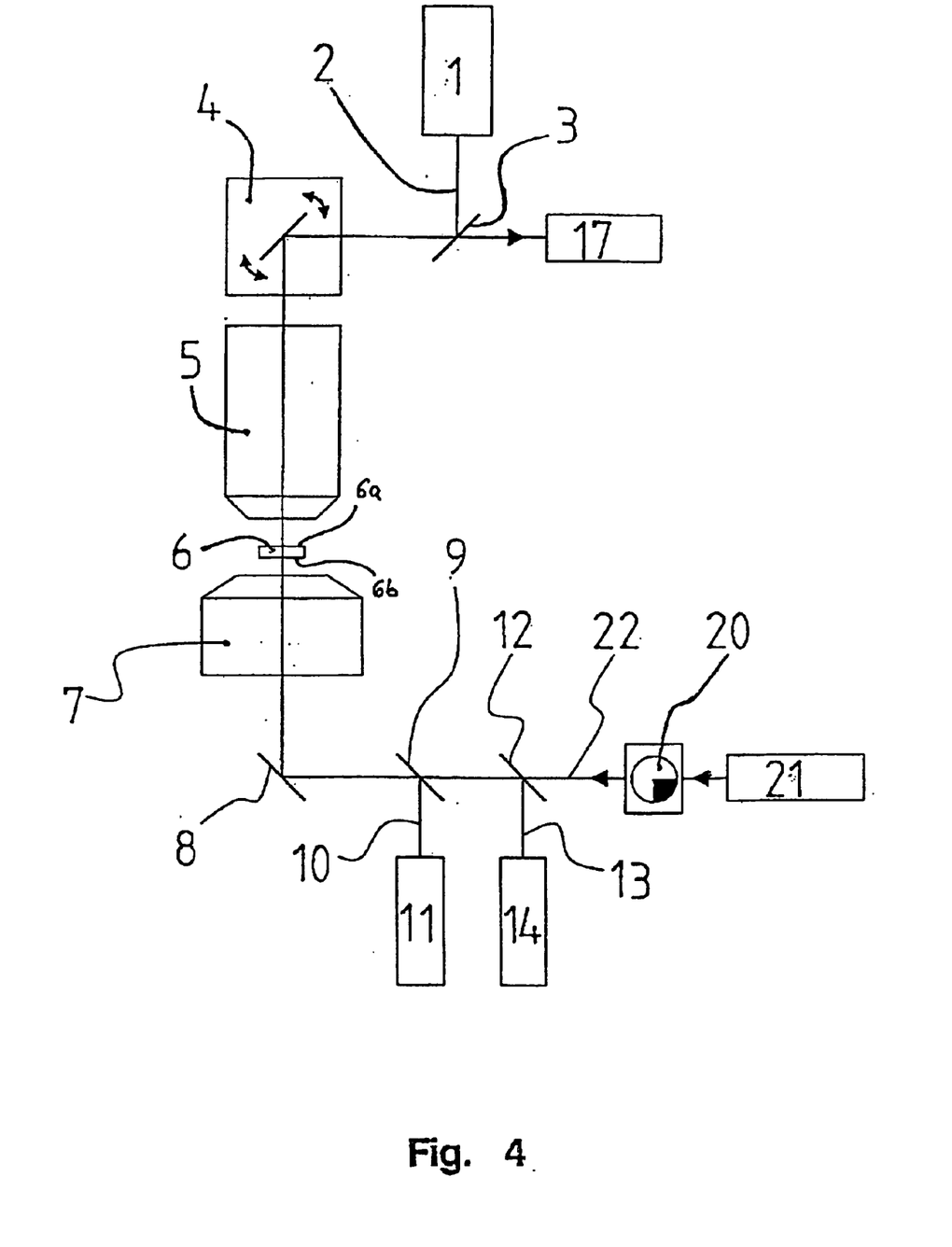
FIG. 4 shows, in a schematic depiction, a fourth exemplary embodiment of a microscope assemblage according to the present invention having an additional light source.

FIG. 4 shows, in a schematic depiction, a fourth exemplary embodiment of a microscope assemblage according to the present invention. The microscope assemblage shown in FIG. 4 corresponds for the most part to the microscope assemblage shown in FIG. 1, components that correspond to components already described in FIG. 1 being labeled with the same reference characters.

In the microscope assemblage shown in FIG. 4, specimen 6 is also illuminated on the condenser side by way of an additional light source 21. Additional light source 21 is thus arranged on the side of specimen 6 facing away from light source 1. An additional reverse beam path is thus present here.

Additional light source 21 has associated with it, for phase-contrast purposes, a sector stop 20 in the Fourier plane in front of additional light source 21. Additional light source 21 generates an illuminating light beam 22 that passes through specimen 6 and is detected by way of detector 17. Prior to detection, illuminating light beam 22 experiences a scanning operation by way of scanning device 4. The detector 17 detects the transmitted light and could also be referred to as a "scanner detector." This detector 17 is capable, for example, of sensing the Dodt light or Hoffman light.

Figure 5:
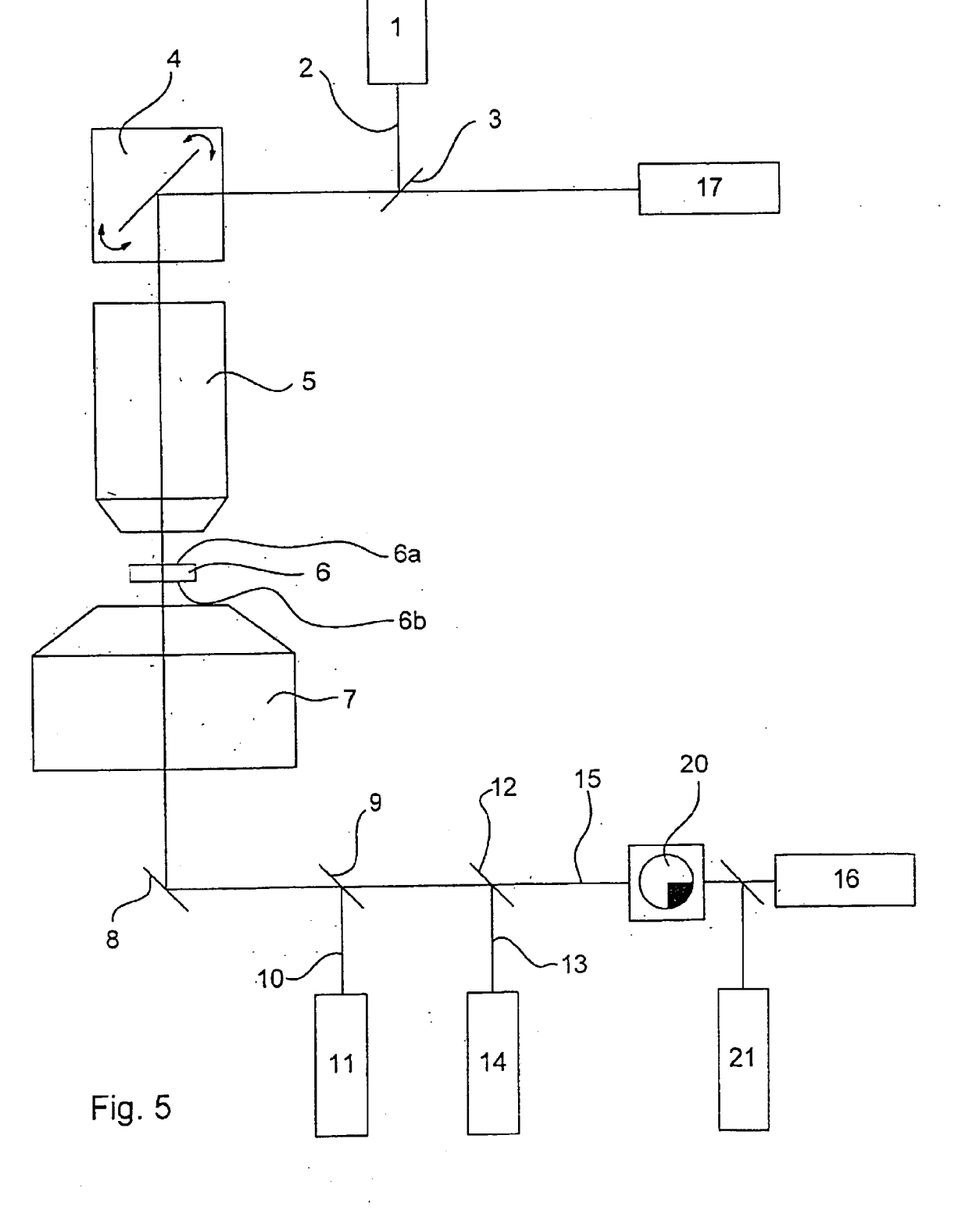
FIG. 5 illustrates an embodiment of the present invention comprising an additional light source and a transmitted light detector operatively arranged on the side of the specimen facing away from the light source 1.

As shown in FIG. 5, the microscope assemblage of the present invention may also be configured to comprise transmitted-light detector 16 and additional light source 21 operatively arranged on the side of the specimen 6 facing away from light source 1.

Figure 6:
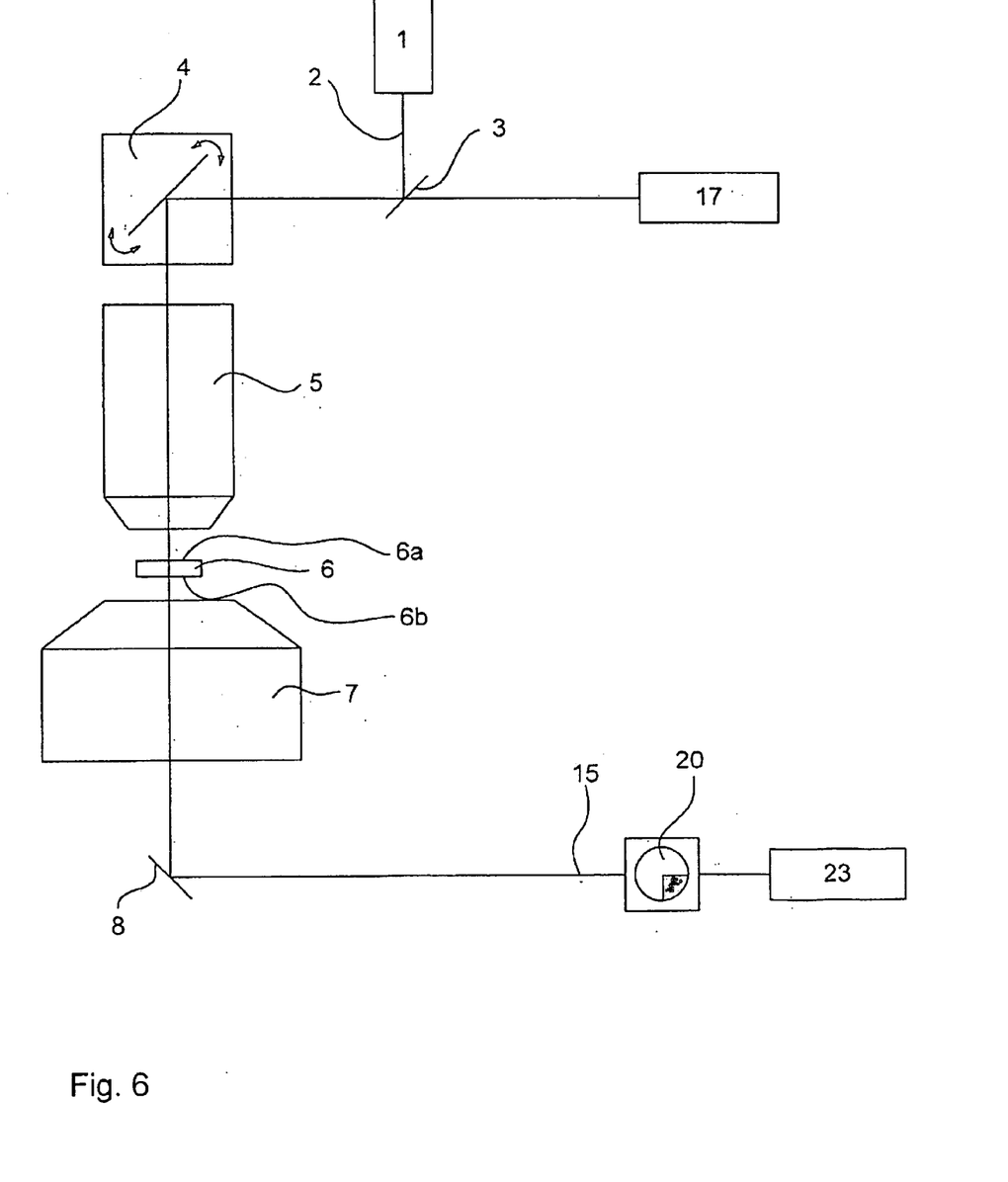
FIG. 6 illustrates an embodiment of the present invention comprising a detector for detecting both transmitted and fluorescent light in a single detector.

Finally, FIG. 6 illustrates a microscope assemblage according to the present invention comprising detector 23 for detecting both transmitted and fluorescent light in a single detector.

The microscope assemblage according to the present invention could be used in particular with two-photon excitation, since in this case any differentiation, using a stop arrangement, between fluorescent photons from the focus region and fluorescent photons from the adjacent regions is superfluous. The microscope assemblage is moreover suitable for interference contrast microscopy using polarization prisms, and for transmitted-light contrast microscopy with the aid of sector stops.

The microscope assemblage can be used for sequential detection of different fluorescent spectral regions and/or of transmitted light, without mechanical switchover operations. The microscope assemblage is thus particularly suitable for applications with micropipettes, micromanipulators, or the like.

Regarding further advantageous embodiments of the microscope assemblage according to the present invention, reference is made, in order to avoid repetition, to the general portion of the specification and to the appended Claims.

Lastly, be it noted expressly that the above-described exemplary embodiments of the microscope assemblage according to the present invention serve only to present the teaching that is claimed, but do not limit it to those exemplary embodiments.

PARTS LIST

1 Light source
2 Illuminating light beam
3 Main beam splitter
4 Scanning device
5 Objective
6 Specimen
6a top side
6b bottom side
7 Condenser
8 Mirror
9 Color beam splitter
10 Wavelength region
11 Fluorescent-light detector
12 Color beam splitter
13 Wavelength region
14 Fluorescent-light detector
15 Transmitted light
16 Transmitted-light detector
17 Detector
18 Polarization prism
19 Polarization filter
20 Sector stop
21 Additional light source
22 Illuminating light beam
23 Transmitted and Fluorescent light detector

What is claimed is:

1. A microscope assemblage for confocal scanning microscopy comprising:
    a light source (1) for illuminating a specimen (6);
    at least one fluorescent-light detector (11, 14) for the detection of fluorescent light (10, 13) generated in the specimen (6), wherein the specimen (6) defines a top side (6a) facing the light source (1) and a bottom side (6b) facing away from the light source (1);
    at least one transmitted-light detector (16) for the detection of transmitted light (15) passing through the specimen (6); said transmitted light comprising that light not produced by the fluorescence of said specimen; and,
    an additional light source (21) operatively arranged on the side of the specimen (6) facing away from the light source (1) and arranged for illuminating said specimen; said light source (1) operatively arranged on a top side of said specimen, said additional light source (21) and said transmitted light detector (16) on the side facing away from said specimen operatively arranged to simultaneously detect said transmitted light and to illuminate said specimen.

2. The microscope assemblage as defined in claim 1, characterized in that the additional light source (21) is a white light source.

3. The microscope assemblage as defined in claim 1, characterized in that an optical system is a member selected from the group consisting of a sector optical system, a sector polarization optical system, a sector stop, a sector phase stop and a sector phase filter, said optical system associated with said additional light source.

4. The microscope assemblage as defined in claim 3, characterized in that the optical system is arranged in a Fourier plane before the additional light source (21).

5. The microscope assemblage as defined in claim 1, characterized in that a condenser (7) for the transmitted light (15) and the fluorescent light (10, 13) is arranged on the side of the specimen (6) facing away from the light source (1).

6. The microscope assemblage as defined in claim 5, characterized in that an objective (5) is arranged between the light source (1) and the specimen (6) and the aperture of the condenser (7) is larger than the aperture of the objective (5).

7. The microscope assemblage as defined in claim 6, characterized in that the transmitted light (15) and the fluorescent light (10, 13) are divisible on the side of the specimen (6) facing away from the light source (1), after passing through the condenser (7).

8. The microscope assemblage as defined in claim 7, characterized in that at least one color beam splitter (9, 12) is used to provide light to at least one fluorescent-light detector (11, 14).

9. The microscope assemblage as defined in claim 7, characterized in that a multiband detector is used for spectral separation.

10. The microscope assemblage as defined in claim 1, characterized in that the fluorescent light (10, 13) and transmitted light (15) are detectable in one detector.

11. The microscope assemblage as defined in claim 1, characterized in that the fluorescent light (10, 13) and transmitted light (15) are detectable in different detectors (11, 14; 16).

12. The microscope assemblage as defined in claim 1, characterized in that a scanning device (4) is arranged on the side of the specimen (6) facing toward the light source (1).

13. The microscope assemblage as defined in claim 1, characterized in that at least one detector (17) is arranged on the side of the specimen (6) facing toward the light source (1), on the side of scanning device (4) facing away from the specimen (6).

14. The microscope assemblage as defined in claim 1, characterized in that the light source (1) is a laser.

* * * * *